United States Patent [19]

Thom et al.

[11] 4,076,763
[45] Feb. 28, 1978

[54] POLYSILOXANE/POLYCARBODIIMIDE COPOLYMERS

[75] Inventors: Karl-Friedrich Thom; Reinhard Schliebs, both of Cologne, Germany

[73] Assignee: Bayer Aktiengesellschaft, Leverkusen, Germany

[21] Appl. No.: 758,528

[22] Filed: Jan. 11, 1977

[30] Foreign Application Priority Data

Jan. 23, 1976 Germany .............................. 2602413

[51] Int. Cl.² .............................................. C08L 83/00
[52] U.S. Cl. ............................ 260/824 R; 260/46.5 E; 260/46.5 G
[58] Field of Search ...................... 260/46.5 G, 46.5 E, 260/46.5 R, 824 R

[56] References Cited

U.S. PATENT DOCUMENTS 3,740,305  6/1973  Hoback et al. ................... 260/824 R
4,011,279  3/1977  Berger et al. ...................... 260/824 R

*Primary Examiner*—Lewis T. Jacobs
*Attorney, Agent, or Firm*—Burgess, Dinklage & Sprung

[57] ABSTRACT

An organopolysiloxane/polycarbodiimide copolymer comprising optionally repeating structural units of the formula

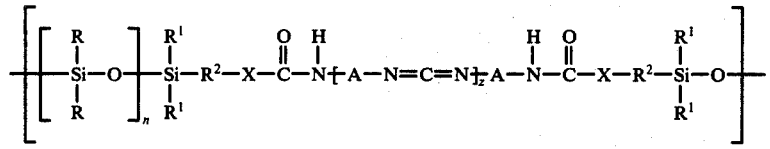

wherein
R is an alkyl, alkenyl or aryl radical with up to 12 carbon atoms,
R¹ is an alkyl radical with up to 4 carbon atoms,
R² is a divalent hydrocarbon radical with up to 6 carbon atoms,
X is oxygen or the group

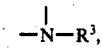

R³ is hydrogen or an alkyl, aryl, aralkyl or cycloalkyl radical with up to 8 carbon atoms,
A is a divalent aromatic radical with up to about 40 carbon atoms,
n is an integer from 0 to about 10,000,
z is an integer from 1 to about 1500 is produced by reacting a stoichiometric excess of a diisocyanate of the formula A(NCO)₂ with at least one member selected from the group consisting of an α,ω-diaminoalkylpolysiloxane of the formula

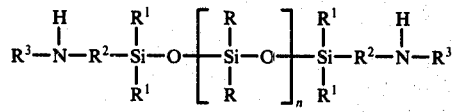

and an α,ω-dihydroxypolysiloxane of the formula

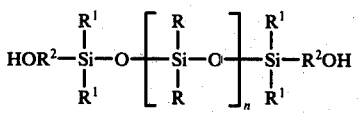

in the presence of a carbodiimidization catalyst.

7 Claims, No Drawings

POLYSILOXANE/POLYCARBODIIMIDE COPOLYMERS

The present invention relates to novel organopolysiloxane/carbodiimide copolymers which contain, optionally repeating structural units of the formula

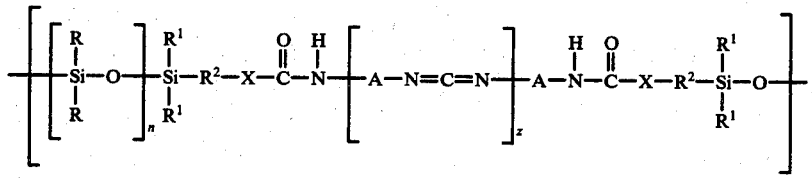

wherein
R is an alkyl, alkenyl or aryl radical with up to 12 carbon atoms,
$R^1$ is an alkyl radical with up to 4 carbon atoms,
$R^2$ is a divalent hydrocarbon radical with up to 6 carbon atoms,
X is oxygen or the group $-N-R^3$,
$R^3$ is hydrogen or an alkyl, aryl, aralkyl or cycloalkyl radical with up to 8 carbon atoms,
A is a divalent aromatic radical with up to about 40 carbon atoms,
n is an integer from 0 to about 10,000, preferably about 10 – 500,
z is an integer from 1 to about 1500, and preferably about 5 to about 1000,
and to a process for the preparation of such copolymers.

The process for the preparation of the copolymers according to the invention is characterized in that addition products of α,ω-diaminoalkylpolysiloxanes of the formula I

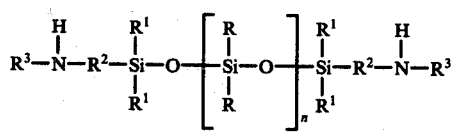

and/or α,ω-dihydroxyalkylpolysiloxanes of the formula II

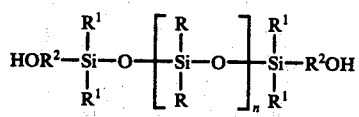

and diisocyanates $A(NCO)_2$ in which R, $R^1$, $R^2$, $R^3$, A and n have the abovementioned meaning, are subjected, in the presence of an excess of the diisocyanate, to a carbodiimidization reaction with the aid of a catalyst which is in itself known.

Preferably R is an alkyl, alkenyl or aryl radical with up to 6 carbon atoms, especially methyl, vinyl and phenyl; $R^1$ is methyl; $R^2$ has up to 3 carbon atoms, i.e. methylene, ethylene and propylene; and $R^3$ preferably is an alkyl or phenylalkyl radical with up to 4 carbon atoms in the alkyl moiety, cycloalkyl or hydrogen, especially hydrogen, methyl, cyclohexyl, benzyl and isobutyl.

The starting substances for the process according to the invention, that is to say diorganopolysiloxanes which have Si—$R^2$—$NHR^3$ or Si—$R^2$—OH end groups, are inexpensive products and can be prepared according to known processes (compare, for example, W. Noll, Chemie und Technologie der Silicone (Chemistry and Technology of Silicones), 1968, page 140 and 149, Weinheim, Bergstrasse). The viscosity of the diorganopolysiloxanes employed is appropriately so selected that it is above 200 cP/25° C and preferably above 20,000 cP/25° C.

Examples of diisocyanates $A(NCO)_2$ which can be used are the aromatic diisocyanates which are in themselves known, for example 2,4- and 2,6-toluylene-diisocyanate as well as any desired mixtures of these isomers and 4,4-diphenylmethane-diisocyanate and reaction products of diols with an excess of diisocyanate; these may optionally be substituted. As a rule, the diisocyanates which are readily available industrially, for example the mixture of the 2,4- and 2,6-toluylene-diisocyanate isomers and liquid diphenylmethane-diisocyanate, and an addition product of tripropylene glycol and 4,4'-diphenylmethane-diisocyanate, are particularly preferred. 1,5-Naphthalene-diisocyanate, 4,4'-dibenzyl-diisocyanate, 1,3-phenylene-diisocyanate or 1,4-phenylene-diisocyanate are also suitable.

Suitable catalysts for the carbodiimidization reaction are the known catalysts, especially phospholine oxides

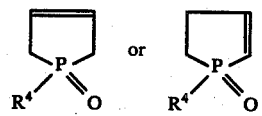

$R^4$ = an alkyl radical, such as, for example, the methyl or ethyl radical, or a phenyl radical, or mixtures thereof, which can also be substituted in the ring, or the corresponding phospholanes or the phosphetanes

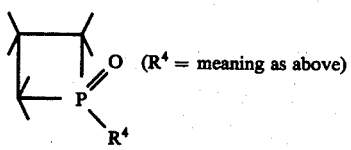

($R^4$ = meaning as above)

1-methyl-1-oxophospholine (mixture of isomers) is preferred because it is more readily available.

The polysiloxane/carbodiimide copolymers according to the invention are advantageously prepared by mixing an α,ω-diaminoalkylpolysiloxane and/or an α,ω-dihydroxyalkylpoly-siloxane with about 3–50% by weight, preferably about 20–45% by weight, based on the polysiloxane of a diisocyanate at room temperature or elevated temperature up to about 120° C, while stirring vigorously, if necessary in a kneader, and subsequently carrying out the carbodiimidization reaction by adding catalytic amounts of phospholine oxide, i.e. about 0.01 to 2% by weight of the whole mass. The $CO_2$ formed during the reaction is removed from the copolymer at a higher temperature up to about 110° C and in vacuo. It has proved particularly advantageous, especially when rubber-like diorganopolysiloxanes are employed, to carry out the reaction in a solvent, such as, for example, toluene.

The diisocyanate is preferably employed in stoichiometric excess relative to the organopolysiloxane, i.e. more than about 1 isocyanate radical per terminal —$R^2OH$ and/or —$R^2NHR^3$ radical, especially about 1.1 to 50 isocyanate radicals.

The resulting polysiloxane/carbodiimide copolymers are solid elastic products, the softening range of which extends up to about 250° C, depending on the proportion of carbodiimide.

The copolymers according to the invention can be mixed with fillers on a mill, if necessary at relatively high temperatures and vulcanized in the conventional way. Both inorganic and organic fillers can be employed as the fillers. Fillers based on $SiO_2$, for example Aerosil, iron oxide and carbon black, are preferred.

Short-chain diorganopolysiloxanes having SiOH end groups can be used as processing auxiliaries.

Curing of the copolymers according to the invention can be effected by means of chemical vulcanizing agents or by irradiation with high energy electrons. The preferred curing agents are organic peroxides which are customarily used for curing silicone elastomers, for example dicumyl peroxide.

The copolymers according to the invention find diverse application; inter alia they are used as electrical insulating materials which, above all, have the advantage of self-extinguishing properties.

The subject of the present invention will now be explained in even more detail with the aid of the examples which follow.

EXAMPLE 1 a. Preparation of an aminoalkylpolysiloxane with a viscosity of 45,000 cP/25° C 2 kg of a polydimethylsiloxane having SiOH end groups and 0.175 mole % of

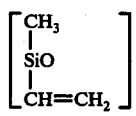

with a viscosity of 45,000 cP/25° C are reacted with 20 g of isobutylaminomethyldimethylmonoethoxysilane to give a polydimethylsiloxane having

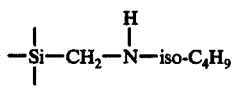

end groups, the alcohol being split off.

b. Preparation of a rubber-like aminomethylpolysiloxane 1 kg of a polydimethylsiloxane having SiOH end groups and a penetrometer value of 450 is dissolved in 1,250 ml of toluene and 15 g of cyclohexylaminomethyldimethylmonoethoxysilane are added. The mixture is stirred for 3 hours at room temperature and then heated up to 110° C whereby 500 ml of solvent are distilled off, together with the alcohol formed.

c. Polysiloxane/carbodiimide copolymers 10 g about 4,75% of excess NCO-groups of a mixture of isomers consisting of 2,4- and 2,6-toluylene-diisocyanate are added dropwise to 200 g of the isobutylaminomethylpolysiloxane prepared in Example 1a, while stirring vigorously with exclusion of moisture.

The reaction is exothermic and the temperature of the reaction mixture rises to 45° C. When the addition is complete, the mixture is stirred for a further 1 hour and 0.1 g of 1-methyl-1-oxophospholine (mixture of isomers) is added. A slight evolution of gas ($CO_2$) starts immediately. The reaction mixture is kept at 80° C for 1 hour, during which time the bulk of the $CO_2$ escapes. In order to remove residual $CO_2$, the mixture is heated briefly up to 110° C, while applying a vacuum at the same time. On cooling, a white elastic product which has a softening range of 160° – 185° C is isolated. IR analysis of the product gives a sharp peak at 4.7 μ (for carbodiimide).

EXAMPLE 2

60 g (~13% of excess NCO groups) of a mixture of isomers consisting of 2,4- and 2,6-toluylene-diisocyanate are added, under the experimental conditions described in Example 1c, to 400 g of the aminomethylpolysiloxane prepared in Example 1a. The carbodiimidization reaction is then carried out using 0.2 g of phospholine oxide (mixture of the isomers of 1-methyl-1-oxophospholine). The resulting white elastic product has a softening range of 180° – 200° C. Blends are prepared on a mill and then vulcanized for 15 minutes at 175° C. The results are summarized in the following Table:

Table I

| Examples | 2 | 3 | 4 |
|---|---|---|---|
| Copolymer | 100 P | 100 P | 100 P |
| Aerosil 130 | | 30 P | 30 P |
| Iron oxide | | | 2 P |
| Dicumyl peroxide | 1 P | 1 P | 1 P |
| Shore A hardness | 27 | 60 | 58 |
| Elasticity | 78 | 58 | 50 |

(here and in the text which follows, P= parts by weight)

EXAMPLE 5

2.481 kg of an aminomethylpolysiloxane prepared according to Example 1a are introduced into a kneader and reacted in the course of 2 hours with 0.744 kg, i.e. ~23% excess of NCO based on the siloxane, of toluylene-diisocyanate, which is added in portions. 1.5 g of phospholine oxide are added and the reaction mixture is heated up to 80° C by means of steam heating. The reaction time is 2 hours; the reaction mixture is then degassed and cooled to room temperature. The product isolated is further dried for 8 hours at 80° C in a vacuum drying cabinet. Softening range 205° – 210° C.

Using the resulting material, blends are made on a hot mill (about 160° C) and vulcanized for 15 minutes at 175° C. The results are summarized in the following Table:

Table II

| Examples | 5 | 6 | 7 | 8 |
|---|---|---|---|---|
| Copolymer | 100 P | 100 P | 100 P | 100 P |
| Aerosil 380 | 10 P | | | |
| Carbon black | | 20 P | 20 P | 20 P |
| Luperco 101 XL* | 1.5 P | 1.5 P | 3.0 P | 3.0 P |
| Shore A hardness | 48 | 51 | 52 | 77 |
| Elasticity | 59 | 59 | 57 | 43 |

Note: Luperco is a 2,5-di-tertiary-butyl-peroxy-2,5-dimethylcyclohexane.

EXAMPLE 9

The rubber-like aminomethylpolysiloxane prepared in Example 1b is reacted with 300 g (23% NCO-excess) of toluylene-diisocyanate and 1 g of phospholine oxide to give a polysiloxane/carbodiimide copolymer. Softening range: 160° – 200° C.

Vulcanization, by means of peroxide, of a blend comprising 100 parts by weight of the copolymer, 30 parts by weight of Aerosil 130 and 1 part by weight of dicumyl peroxide for 15 minutes at 175° C gives a product which has a Shore hardness of 55 and an elasticity of 50.

Differing from the examples described hitherto, the examples which follow are carried out using a diisocyanate based on 4,4'-diphenylmethane-diisocyanate and tripropylene glycol (23% of NCO) (Desmodur PF$^R$).

EXAMPLE 10

A polysiloxane/carbodiimide copolymer is prepared analogously to Example 1a from 400 g of aminomethylpolysiloxane, 100 g (20%) of Desmodur PF and 0.2 g of phospholine oxide under the reaction conditions described in Example 1c. A white, very tough rubber is obtained which, after blending on a mill with 30% its weight of Aerosil 130 and 1% its of dicumyl peroxide and subsequently vulcanizing for 15 minutes at 175° C, has the following properties:
Shore A = 75
Elasticity = 45

EXAMPLE 11

Example 10 is repeated, with the difference that Desmodur PF with 40% excess NCO-groups are employed. Vulcanization of a blend of 100 parts by weight of the copolymer, 30 parts by weight of Aerosil 130 and 1 part by weight of dicumyl peroxide gives a product which has a Shore A hardness of 82 and an elasticity of 49.

EXAMPLE 12

If 300 g of an aminomethylpolysiloxane prepared analogously to Example 1b are reacted with 200 g (40% NCO excess) of Desmodur PF and 0.2 g of phospholine oxide to give a copolymer, the vulcanized product prepared therefrom has the following properties:
Shore A = 78
Elasticity = 37

EXAMPLE 13

200 g of a polydimethylsiloxane containing

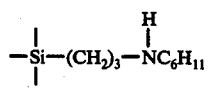

and having a viscosity of 25,000 cP/25° C, which had been prepared by equilibration of dicyclohexylaminopropyltetramethyldisiloxane with octamethyltetrasiloxane, are subjected to a carbodiimidization reaction with 50 g (20% NCO excess) of toluylene diisocyanate and 0.1 g of 1-methyl-1-oxophospholine.

The resulting copolymer is mixed with 60 parts by weight of Aerosil 130 and 2 parts by weight of dicumyl peroxide and the mixture is then vulcanized for 15 minutes at 175° C. The vulcanized product has the following properties:
Shore A = 62
Elasticity = 55

EXAMPLE 15

300 g of a mixture of 250 g of a diorganopolysiloxane

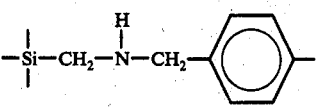

end groups (viscosity 30,000 cP/25° C) and 50 g of a diorganopolysiloxane having

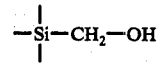

end groups (viscosity 300 cP/25° C) are reacted with 200 g (~40% NCO-excess) of toluylene-diisocyanate and 0.2 g of phospholine oxide to give a copolymer. Vulcanization of a mixture of 100 parts by weight of the copolymer, 30 parts by weight of Aerosil 130 and 1 part by weight of dicumyl peroxide gives a product which has a Shore hardness of 68 and an elasticity of 53.

EXAMPLE 16

200 g of a diorganopolysiloxane having

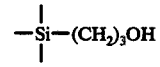

end groups (viscosity 20,000 cP/25° C) are reacted with 50 g (~20% NCO-excess) of toluylene-diisocyanate and 0.1 g of phospholine oxide to give a polysiloxane/carbodiimide copolymer. Vulcanization of a blend of 100 parts by weight of the copolymer, 30 parts by weight of Aerosil 130 and 1 part by weight of dicumyl peroxide gives a product which has a Shore hardness of 63 and an elasticity of 58.

It will be appreciated that the instant specification and examples are set forth by way of illustration and not limitation, and that various modifications and changes may be made without departing from the spirit and scope of the present invention.

What is claimed is:

1. An organopolysiloxane/polycarbodiimide copolymer comprising optionally repeating structural units of the formula

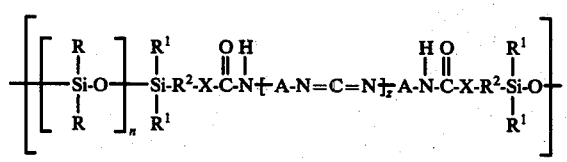

wherein
R is an alkyl, alkenyl or aryl radical with up to 12 carbon atoms,
R$^1$ is an alkyl radical with up to 4 carbon atoms,
R$^2$ is a divalent hydrocarbon radical with up to 6 carbon atoms,
X is oxygen or the group —N—R$^3$, $R^3$ is hydrogen or an alkyl, aryl, aralkyl or cycloalkyl radical with up to 8 carbon atoms, A is a divalent aromatic radical with up to about 40 carbon atoms, $n$ is an integer from 0 to about 10,000, $z$ is an integer from 1 to about 1500.

2. A copolymer according to claim 1, wherein

R is an alkyl, alkenyl or aryl radical with up to 6 carbon atoms, $R^1$ is methyl, $R^2$ is an alkylene radical with up to 3 carbon atoms, $R^3$ is an alkyl or phenylalkyl radical with up to 4 carbon atoms in the alkyl moiety, cyclohexyl or hydrogen, and $n$ is an integer from about 10 to 500.

3. A copolymer according to claim 2, wherein

R is methyl, vinyl or phenyl, $R^3$ is hydrogen, methyl, cyclohexyl, benzyl or isobutyl, and A is a divalent radical of toluene, diphenylmethane, naphthalene, dibenzyl or benzene.

4. A process for the preparation of an organopolysiloxane/carbodiimide copolymer according to claim 1, comprising reacting a stoichiometric excess of a diisocyanate of the formula $A(NCO)_2$ with at least one member selected from the group consisting of an α,ω-diaminoalkoxypolysiloxane of the formula

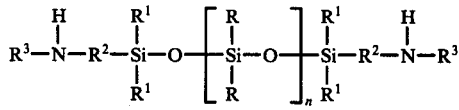

and an α,ω-dihydroxypolysiloxane of the formula

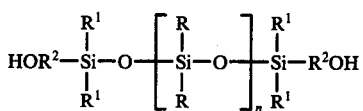

in the presence of a carbodiimidization catalyst.

5. The process according to claim 4, wherein

R is an alkyl, alkenyl or aryl radical with up to 6 carbon atoms, $R^1$ is methyl, $R^2$ is an alkylene radical with up to 3 carbon atoms, $R^3$ is an alkyl or phenylalkyl radical with up to 4 carbon atoms in the alkyl moiety, cyclohexyl or hydrogen, and $n$ is an integer from about 10 to 500.

6. The process according to claim 4, wherein

R is methyl, vinyl or phenyl, $R^3$ is hydrogen, methyl, cyclohexyl, benzyl, or isobutyl, and A is a divalent radical of toluene, diphenylmethane, naphthalene, dibenzyl or benzene.

7. The process according to claim 4, wherein the diisocyanate and organopolysiloxane are first combined in a solvent and a phospholine oxide, phospholane or phosphoetane is thereafter added in about 0.001 to 2% by weight of the reactants.

* * * * *